(12) United States Patent
Oohashi et al.

(10) Patent No.: US 6,469,413 B1
(45) Date of Patent: Oct. 22, 2002

(54) ALTERNATOR

(75) Inventors: Atsushi Oohashi, Tokyo (JP); Yoshihiro Harada, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/769,271

(22) Filed: Jan. 26, 2001

(30) Foreign Application Priority Data

Jul. 24, 2000 (JP) .................................... 2000-222077

(51) Int. Cl.[7] .................................... H02K 3/28
(52) U.S. Cl. ..................... 310/184; 310/71; 310/180; 310/201; 310/207
(58) Field of Search ........................... 310/71, 179, 180, 310/184, 201, 207

(56) References Cited

U.S. PATENT DOCUMENTS

| | | | |
|---|---|---|---|
| 5,682,070 A | * 10/1997 | Adachi et al. ............ 310/68 D |
| 6,140,735 A | 10/2000 | Kato et al. | |
| 6,208,058 B1 | * 3/2001 | Taji et al. .................... 310/108 |
| 6,268,678 B1 | * 7/2001 | Asao et al. ................. 310/180 |
| 6,326,715 B1 | * 12/2001 | Asao et al. ................. 310/180 |

FOREIGN PATENT DOCUMENTS

JP  11-155270  6/1999 .......... H02K/19/22

* cited by examiner

*Primary Examiner*—Burton S. Mullins
(74) *Attorney, Agent, or Firm*—Sughrue Mion, PLLC

(57) ABSTRACT

An alternator includes a stator winding in which a plurality of lead wires extending from winding phase groups for each phase are connected in an alternating connection via a terminal assembly for three-phase connection, and the terminal assembly for three-phase connection is disposed at a side of a rotor to which a fan unit is fixed and opposite to the rotor with respect to an end face of the fan unit in the axial direction of the rotor, the terminal assembly opposing the top of a coil-end group of the stator winding.

11 Claims, 13 Drawing Sheets

ALTERNATOR

BACKGROUND OF THE INVENTION

1. Field of the Invention

The present invention relates to alternators driven by internal combustion engines. In particular, the present invention relates to a connection structure of a stator winding of an alternator to be mounted on an automotive vehicle, such as an automobile or a truck.

The entire content of the basic Japanese Patent Application from which the priority under the Convention is claimed in this application is hereby incorporated by reference into this application.

2. Description of the Related Art

In recent years, reduced sizes, increased outputs, and improved quality have been increasingly required of alternators. In order to obtain an increased output from an alternator reduced in size, it is important to distribute magnetic loading and electrical loading in a most appropriate manner and at a highest possible concentration within a limited volume.

The outputs of automotive alternators must be increased because of increasing vehicle loads while engine compartments become smaller, thereby reducing spaces for mounting the alternators. There are requirements to reduce the noise of the automotive alternators which operate all the time for supplying electricity, the noise becoming relatively large with respect to the engine noise which has been reduced in response to the requirements to reduce the noise generated toward the outside and the inside of the vehicle compartments. The automotive alternators, which operate all the time, are required to have a very high heat resistance because of their severe operating thermal condition in which the alternators are heated by a high Joule heat generated by the output current.

In order to reduce the size and increase the output of an alternator, the resistance of a stator winding must be reduced, the space factor of electrical conductors in magnetic circuits of the stator must be increased, and the bridge portions (bridge portions outside a stator core are called coil ends) of the stator winding must be set in order and be concentrated. Furthermore, the requirements for reduced noise and heat resistance, and the like must be complied with.

A structure for reducing the resistance of windings (heat loss), improving the space factor of electrical conductors, and lining up and concentrating coil ends was proposed disclosed in, for example, Japanese Patent No. 2927288, in which conductor segments formed substantially in a U-shape with short conductive wires having large cross-sections are used as strands of wire of the stator winding.

In an alternator of this type, the number of slots per pole and per phase tends to increase, that is, the alternator tends to have a plurality of sets of a three-phase alternating winding in order to comply with the requirements for reduced electrical and magnetic noise and high quality electricity supply, whereby the number of lead wires for the three-phase alternating winding is increased. When forming the three-phase alternating winding, a wiring process is necessary in which lead wires extending from the windings are drawn and are folded, and are connected. The laborious work in the wiring process is required to be alleviated. However, in the above Japanese Patent No. 2927288, the reduction of the load in the wiring process was not considered.

Therefore, the applicant of the present invention proposed a connection structure of lead wires of a stator winding in Japanese Patent Application No. 2000-011704 (a privately known but unpublished), for reducing load in a wiring process by alleviating the work for drawing and folding lead wires during a connection process of the stator winding.

FIG. 11 is a sectional view of a known automotive alternator proposed in Japanese Patent Application No. 2000-011704. FIG. 12 is a perspective view of a stator used in the known automotive alternator. FIG. 13 is a rear-end view explaining connections in one phase of a stator winding of the known automotive alternator. FIG. 14 is a perspective view of a terminal assembly for three-phase alternating connections in the stator of the known automotive. FIG. 15 is an illustration explaining a method of connection between a rectifier and the stator winding of the known automotive alternator. FIG. 16 is a block diagram of a circuit used in the known automotive alternator.

The automotive alternator shown in FIG. 11 includes a Lundell-type rotor 7 rotatably supported by a shaft 6 in a case 3 formed with aluminum front bracket 1 and rear bracket 2. A stator 8 is fixed to the inner wall of the case 3 so as to cover the rotor 7 at the periphery of the rotor 7.

The shaft 6 is rotatably supported by the front bracket 1 and the rear bracket 2. A pulley 4 is fixed to the shaft 6 at one end thereof, for transmitting the rotational torque of an engine to the shaft 6 via a belt (not shown).

Slip rings 9 for feeding current are fixed to the other end of the shaft 6. A pair of brushes 10 are received in a brush holder 11 disposed in the case 3. The pair of brushes 10 are held in contact with the slip rings 9 so as to slide thereon. A regulator 18 for regulating alternating voltage generated at the stator 8 is connected to a heat sink 17 coupled with the brush holder 11. Rectifiers 12 for rectifying alternating current generated at the stator 8 into direct current are mounted in the case 3, the rectifiers 12 being electrically connected to the stator 8.

The rotor 7 includes a rotor coil 13 for generating magnetic flux on passage of electric current, and a pair of pole cores 20 and 21 so as to cover the rotor coil 13, magnetic poles being formed in the pole cores 20 and 21 by the magnetic flux generated in the rotor coil 13. The pair of iron pole cores 20 and 21 include eight claw-shaped magnetic poles 22 and eight claw-shaped magnetic poles 23 around the peripheries of the pole cores 20 and 21, respectively, protruding therefrom and disposed at the same angular distance from each other in the circumferential directions of the respective pole cores 20 and 21. The pair of pole cores 20 and 21 are fastened to the shaft 6 facing each other such that the claw-shaped magnetic poles 22 and 23 intermesh. A fan unit 5 is fixed to the rotor 7 at each axial end thereof.

Intake openings 1a and 2a are formed in the front bracket 1 and the rear bracket 2, respectively, at each axial end face. Discharge openings 1b and two outlets 2b are formed in two outer circumferential shoulder portions of the front bracket 1 and the rear bracket 2, opposite the radial outside of the front-end and rear-end coil-end groups 16f and 16r of the stator winding 16.

In FIG. 12, the stator 8 includes a cylindrical stator core 15, made of laminated iron, provided with a plurality of slots 15a formed extending in the axial direction at a predetermined pitch in the circumferential direction, the stator winding 16 wound onto the stator core 15, and insulators 19 disposed in the slots 15a for electrically insulating the stator winding 16 from the stator core 15. The stator winding 16 includes twenty-four winding sub-portions in each of which one strand of wire 30 is bent back outside the slots 15a at both end surfaces of the stator core 15 and wound in a wave-shape so as to alternately occupy an inner layer and an outer layer in a slot depth direction within slots 15a at every sixth slot (equals a pitch of the magnetic poles). The stator core 15 is provided with ninety-six slots 15a at the same distance from each other so as to receive two sets of the three-phase alternating winding corresponding to the number of the magnetic poles which is 16. A long copper wire having a rectangular cross-section and coated with an insulating film, for example, is used as the strand of wire.

The winding configuration of a winding phase group 161 for a phase a is described below with reference to FIG. 13.

The winding phase group 161 for the phase a includes first to fourth winding sub-portions 31 to 34, each winding sub-portion being formed with one strand of wire 30. The first winding sub-portion 31 is formed in a manner such that one strand of wire 30 is wound in a wave-shape into every sixth slot from slot number 1 to 91 so as to alternately occupy a first position from the inner circumferential side (hereinafter, referred to as a first address) and a second position from the inner circumferential side (hereinafter, referred to as a second address) inside the slots 15a, and both ends of the strand of wire 30 are connected to each other, thereby forming the wave-shaped winding sub-portion in one turn. The second winding sub-portion 32 is formed in a manner such that one strand of wire 30 is wound in a wave-shape into every sixth slot from slot number 1 to 91 so as to alternately occupy the second address and the first address inside the slots 15a, and both ends of the strand of wire 30 are connected to each other, thereby forming the wave-shaped winding sub-portion in one turn. The third winding sub-portion 33 is formed in a manner such that one strand of wire 30 is wound in a wave-shape into every sixth slot from slot number 1 to 91 so as to alternately occupy a third position from the inner circumferential side (hereinafter, referred to as a third address) and a fourth position from the inner circumferential side (hereinafter, referred to as a fourth address) inside the slots 15a, and both ends of the strand of wire 30 are connected to each other, thereby forming the wave-shaped winding sub-portion in one turn. The fourth winding sub-portion 34 is formed in a manner such that one strand of wire 30 is wound in a wave-shape into every sixth slot from slot number 1 to 91 so as to alternately occupy the fourth address and the third address inside the slots 15a, and both ends of the strand of wire 30 are connected to each other, thereby forming the wave-shaped winding sub-portion in one turn. The strands of wire 30 are arranged to line up in a row of four strands within each slot 15a with the longitudinal direction of their rectangular cross-sections aligned in a radial direction.

Portions of the strands of wire 30 of the first and third winding sub-portions 31 and 33 extending from slot numbers 61 and 67 at an end surface of the stator core 15 are cut, respectively, and portions of the strands of wire 30 of the second and fourth winding sub-portions 32 and 34 extending from slot numbers 55 and 61 at the end surface of the stator core 15 are cut, respectively. Then, a cut end 31b of the first winding sub-portions 31 and a cut end 33a of the third winding sub-portion 33 are connected, a cut end 32b of the second winding sub-portions 32 and a cut end 34a of the fourth winding sub-portion 34 are connected, and a cut end 31a of the first winding sub-portions 31 and a cut end 32a of the second winding sub-portion 32 are connected. Thus, the winding phase group 161 in four turns for the phase a is formed with the first to fourth winding sub-portions 31 to 34 connected to each other in series.

Cut ends 33b and 34b of the third and fourth winding sub-portions 33 and 34, respectively, serve as an alternating-current-output lead wire Oa and a neutral-point lead wire Na for the phase a, respectively.

In the same manner, other five sets of four winding sub-portions are disposed in every sixth slot 15a. Thus, the winding phase groups 161 are formed for six phases, each set of four winding sub-portions being offset from the other by one slot.

In FIG. 12, two sets of a three-phase alternating winding constituting the stator winding 16 include twenty-four winding sub-portions connected in an alternating-current connection by using two three-phase-connection terminal-assemblies 100. In FIG. 14, each three-phase-connection terminal-assembly 100 includes a conductive neutral-point-connection member 101, three conductive bridge-connection members 102, and an insulative resin member 103 formed integrally with each other. The conductive neutral-point-connection member 101 is formed by bending a metallic bar made of copper or the like having a rectangular cross-section, and includes three connection tabs 101a and one neutral-point lead wire 101b. Each conductive bridge-connection member 102 is formed by bending a metallic bar made of copper or the like in a U-shape having a rectangular cross-section, and includes connection tabs 102a at the both ends thereof.

Two three-phase-connection terminal-assemblies 100 are disposed on the coil-end group 16r of the stator winding 16 in which the cut ends of the winding sub-portions for each phase are connected in a manner such that the cut ends 31b and 33a of the first and third winding sub-portions 31 and 33, respectively, are connected to each other by arc welding or the like, and the cut ends 32b and 34a of the second and fourth winding sub-portions 32 and 34, respectively, are connected to each other by arc welding or the like. The cut ends 31a and 32a of the first and second winding sub-portions 31 and 32 for each phase are led around, are folded, and are connected to the connection tabs 102a of each conductive bridge-connection members 102 by arc welding or the like. Thus, the winding phase groups 161 for the phase a, phase b, phase c, phase a', phase b', and phase c' are formed, the winding phase group 161 for each phase being configured with the first to fourth winding sub-portions 31 to 34. The cut end 34b of the fourth winding sub-portion 34 for each phase is led, is folded, and is connected to one of the connection tabs 101a of each conductive neutral-point-connection member 101 by arc welding or the like. Thus, a three-phase alternating winding is formed by connecting the winding phase groups 161 for the phases a, b and c in the alternating connection, and another three-phase alternating winding is formed by connecting the winding phase groups 161 for the phases a', b' and c' in the alternating connection. The cut ends 31a and 32a of the first and second winding sub-portions 31 and 32, respectively, function as the bridge-connection lead wires.

In the stator 8 thus configured, as shown in FIG. 12, two three-phase-connection terminal-assemblies 100 are disposed in the vicinity of the coil-end group 16r of the stator winding 16 wound onto the stator core 15. The alternating-current-output lead wires Oa, Ob, Oc, Oa', Ob', and Oc', and the neutral-point lead wires Nabc and Na'b'c', which are the neutral-point lead wires 101b, of the two three-phase alternating windings of the stator winding 16 extend from the coil-end group 16r of the stator winding 16 in the axial direction.

In FIG. 15, a metallic connector 104 is fixed to the alternating-current-output lead wire Oa at the end thereof, is bent in the radial direction, and is connected to the rectifier 12. Other metallic connectors 104 are fixed to the alternating-current-output lead wires Ob, Oc, Oa', Ob', and Oc' and the neutral-point-connection lead wires Nabc and Na'b'c' at the ends thereof, are bent in the radial directions, and are connected to the rectifier 12. Thus, as shown in FIG. 16, three phases each of the winding phase groups 161 are connected into the alternating connection to form the two sets of the three-phase alternating winding 160, and each of the three-phase alternating windings 160 is connected to its own rectifier 12. The direct current outputs of each rectifier 12 are combined by being connected in parallel. The neutral points of the three-phase alternating windings 160 are connected to direct current output terminals of the respective rectifier 12 via diodes 29.

In the known automotive alternator described above, the three-phase-connection terminal-assemblies 100 are disposed in the vicinity of the coil-end group 16r of the stator winding 16 and in a path of cooling air of the fan unit 5 between the coil-end group 16r and the rectifier 12, thereby increasing the wind resistance against the cooling air, whereby decreasing the volume of cooling air. Therefore, the rectifier 12 and the stator winding 16 cannot be cooled effectively, thereby increasing the temperature of the rectifier 12 and the stator winding 16. With the heat-up of the stator winding 16, the output thereof decreases. When the volume of cooling air is the same, wind noise increases by the three-phase-connection terminal-assemblies 100 which are disposed between the coil-end group 16f and the rectifier 12.

In the known alternator, the alternating-current-output lead wires Oa, Ob, Oc, Oa', Ob', and Oc' and the neutral-point-connection lead wires Nabc and Na'b'c' of the three-phase alternating windings 160 are directly connected to the rectifier 12. Therefore, it is necessary to fix the metallic connectors 104 to the above alternating-current-output lead wires and the neutral-point-connection lead wires at the ends thereof, to bend the lead wires in the radial direction, and to couple the metallic connectors 104 with the rectifier 12, thereby increasing load in the connecting process.

The three-phase-connection terminal-assemblies 100, disposed close to the coil-end group 16r, reduce the space required for connection of the neutral-point lead wires and the bridge-connection lead wires with the conductive neutral-point-connection members 101 and the conductive bridge-connection members 102, respectively, thereby deteriorating the operation efficiency in the connecting process. The connecting operation, in which the neutral-point lead wires and the bridge-connection lead wires are led around, are folded, and are connected to the conductive neutral-point-connection members 101 and the conductive bridge-connection members 102, respectively, also deteriorates the efficiency in the connecting process.

SUMMARY OF THE INVENTION

Accordingly, it is an object of the present invention to provide a high-output alternator reduced in size in which wind resistance against the cooling air is reduced, the efficiency in cooling of a rectifier and a stator winding is improved, and the operation efficiency in a connecting process is improved by disposing conductive connecting-members at the rear side of a stator with respect to an end face of a fan unit in the axial direction of the stator so that the conductive connecting-members oppose the top of a coil-end group of the stator winding.

According to an aspect of the present invention, an alternator comprises: a stator including a cylindrical stator core provided with a plurality of slots extending in an axial direction of the stator, the plurality of slots being disposed in parallel to each other along the circumference of the stator, and a stator winding mounted in the plurality of slots of the cylindrical stator core, the stator winding including n-sets (n represents a natural number) of a three-phase alternating winding, each set of the three-phase alternating winding being constructed by connecting winding phase groups for three phases offset from each other by an electrical angle of 120 degrees into an alternating connection; a rotor enclosed by the cylindrical stator core; a fan unit mounted on the rotor; and a rectifier, wherein the stator winding comprises first wave-shaped windings and second wave-shaped windings, the first wave-shaped windings being composed of 3n first winding sub-portions each having one turn constructed by winding in a wave-shape a strand of wire so as to alternately occupy an inner layer and an outer layer in a slot-depth direction within the slots at every 3·nth slot, the first winding sub-portions being disposed at a pitch of one slot from each other, and the second wave-shaped windings being composed of 3n second winding sub-portions each having one turn constructed by winding in a wave-shape the strand of wire so as to alternately occupy the inner layer and the outer layer in the slot-depth direction within the slots at every 3·nth slot and so as to be inversely wound and offset by an electrical angle of 180 degrees relative to the first winding sub-portions, the second winding sub-portions being disposed at a pitch of one slot from each other, whereby m-pairs (m represents a natural number) of the first wave-shaped windings and the second wave-shaped windings are disposed so as to arrange alternately and in a row in-slot-received portions of the first winding sub-portions and in-slot-received portions of the second winding sub-portions in the slot-depth direction within each of said slots; wherein each set of the three-phase alternating winding is formed by connecting a plurality of lead wires to each other extending from the first winding sub-portions and the second winding sub-portions via a conductive relay member, and connecting into the alternating connection the three winding phase groups each composed of the first winding sub-portions and the second winding sub-portions which are mounted in every 3·nth slot; and wherein the conductive relay member opposes the top of a coil-end group of the stator winding across a gap therebetween.

The fan unit may be fixed to the rotor at at least one end thereof, the rectifier may be disposed at a side of the rotor to which the fan unit is fixed, the conductive relay member may be disposed at the side of the rotor to which the fan unit is fixed and be disposed opposite to the rotor with respect to an end face of the fan unit in the axial direction of the rotor, the plurality of lead wires may serve as alternating-output lead wires for the three-phase alternating winding, the conductive relay member may serve as conductive alternating-output-relay members having alternating-current-output-connection terminals extending inwardly in the radial direction of the rotor, and the alternating-output lead wires may be connected to the conductive alternating-output-relay members and be connected to the rectifier via the alternating-current-output-connection terminals.

The plurality of lead wires may serve as neutral-point-connection lead wires for the winding phase group, the conductive relay member may serve as a conductive neutral-point-relay member, and the neutral-point-connection lead wire for each phase may be integrally connected to the conductive neutral-point-relay member.

The conductive neutral-point-relay member may include a neutral-point-connection terminal extending inwardly in the radial direction of the stator, and the neutral-point-connection terminal may be connected to the rectifier.

The plurality of lead wires may serve as bridge-connection lead wires between the first winding sub-portions and the second winding sub-portions, the conductive relay member may serve as conductive bridge-connection-relay members, and the bridge-connection lead wires may be connected to the conductive bridge-connection-relay members, whereby the first winding sub-portions and the second winding sub-portions are bridge-connected.

The plurality of lead wires may extend in parallel to each other from the first winding sub-portions and the second winding sub-portions in the axial direction, and may be connected to the conductive relay member substantially at the same predetermined level as each other from an end face of the stator core.

The conductive relay member and an insulative resin member may be formed integrally with each other.

The stator may be formed so that the coil-end group of the stator winding does not overlap the fan unit in the radial direction.

The size of the conductive relay member in a radial direction of the stator may be not greater than the size of the coil-end group of the stator winding in the radial direction of the stator.

The strand of wire may be a continuous conductive wire, and the first winding sub-portion and the second winding sub-portion may form each of the first wave-shaped windings wound in one turn and each of the second wave-shaped windings wound in one turn, respectively.

The each pair of the first wave-shaped windings and the second wave-shaped windings may be formed with a winding assembly composed of a plurality of the first winding sub-portions and a plurality of the second winding sub-portions.

DESCRIPTION OF THE PREFERRED EMBODIMENTS

An embodiment according to the present invention is described below with reference to the drawings.

Figure 1:
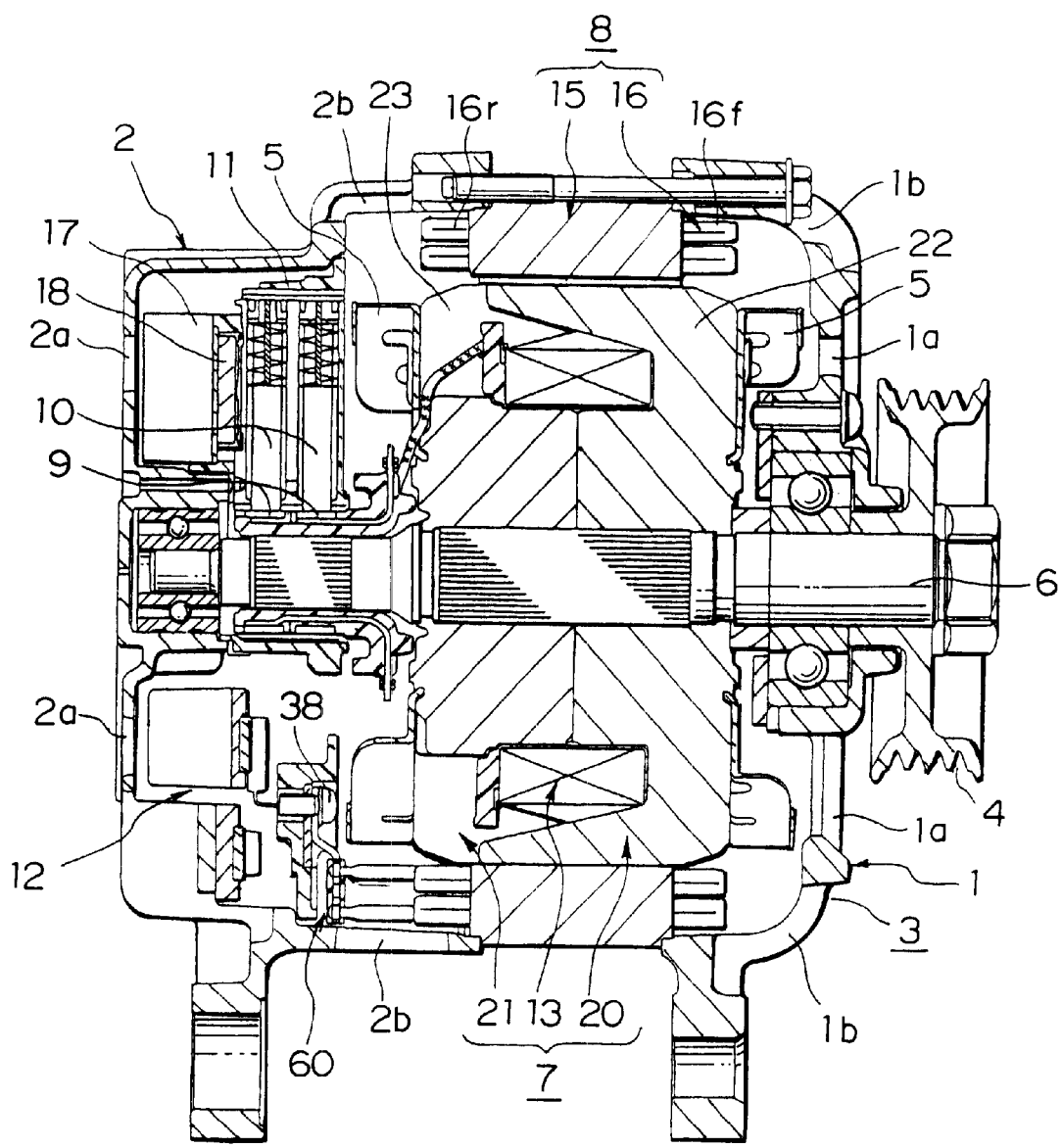
FIG. 1 is sectional view of an automotive alternator according to an embodiment of the present invention.
Figure 2:
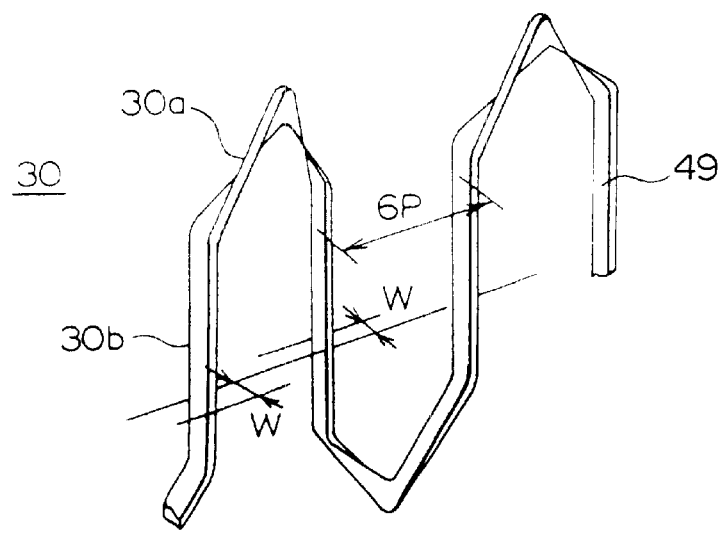
FIG. 2 is a perspective view showing part of a strand of wire constituting a stator winding used in the automotive alternator shown in FIG. 1.
Figure 3:
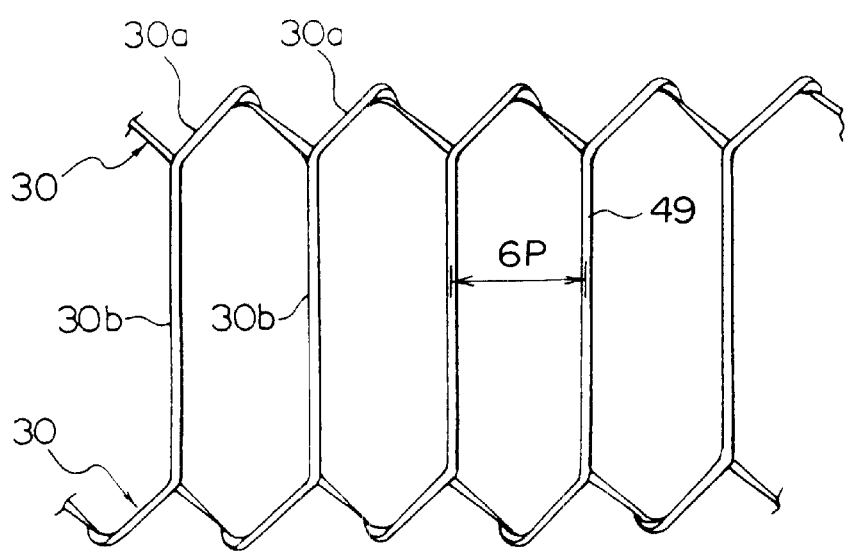
FIG. 3 is a diagram explaining arrangement of the strands of wire constituting the stator winding used in the automotive alternator shown in FIG. 1.
Figures 4A, 4B:
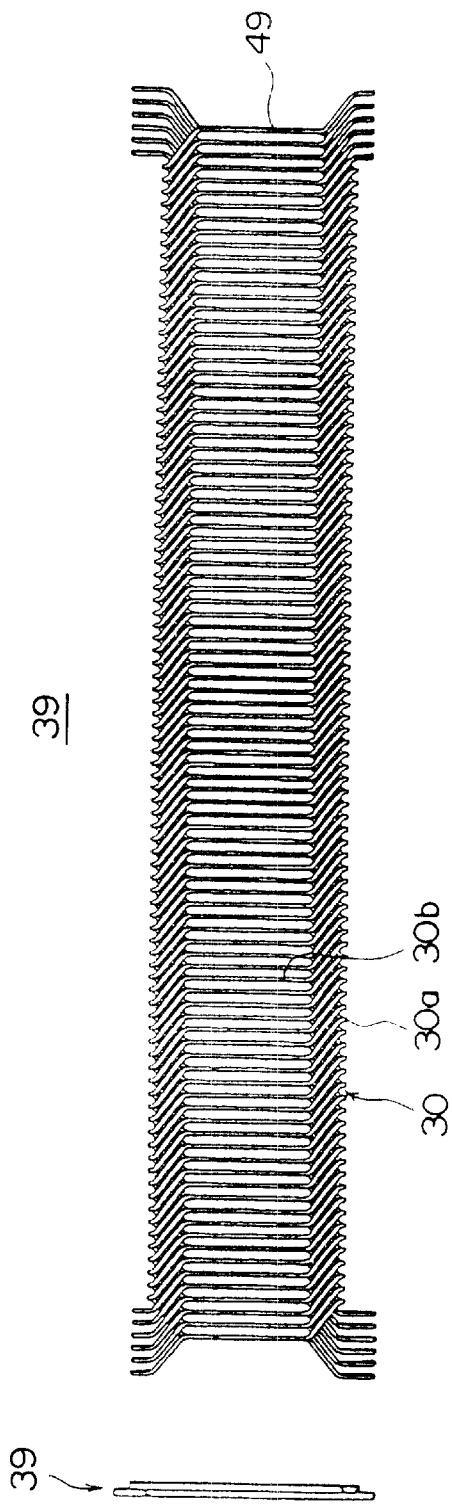
FIG. 4A is an end view of a winding assembly constituting the stator winding used in the automotive alternator shown in FIG. 1.
FIG. 4B is a plan view of the winding assembly constituting the stator winding used in the automotive alternator shown in FIG. 1.
Figure 5:
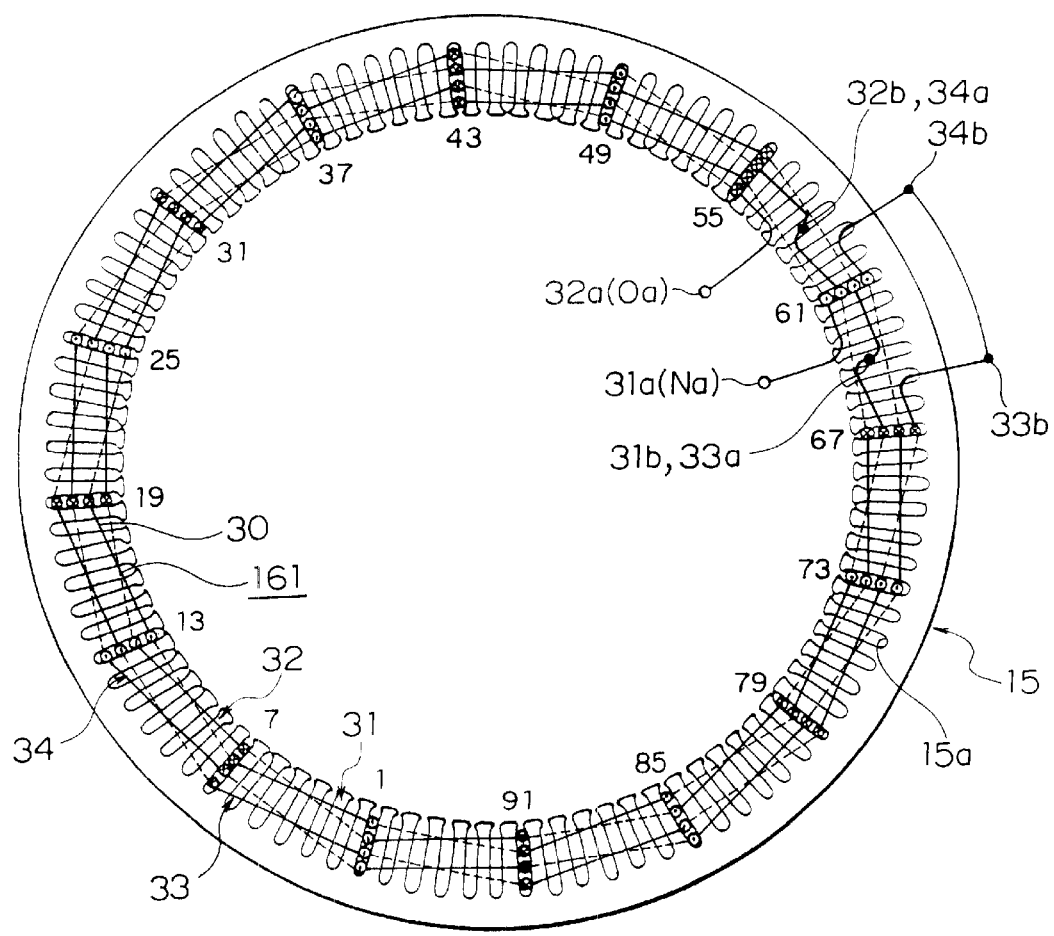
FIG. 5 is a rear-end view explaining connections in one phase of the stator winding used in the automotive alternator according to the embodiment of the present invention.
Figure 6:
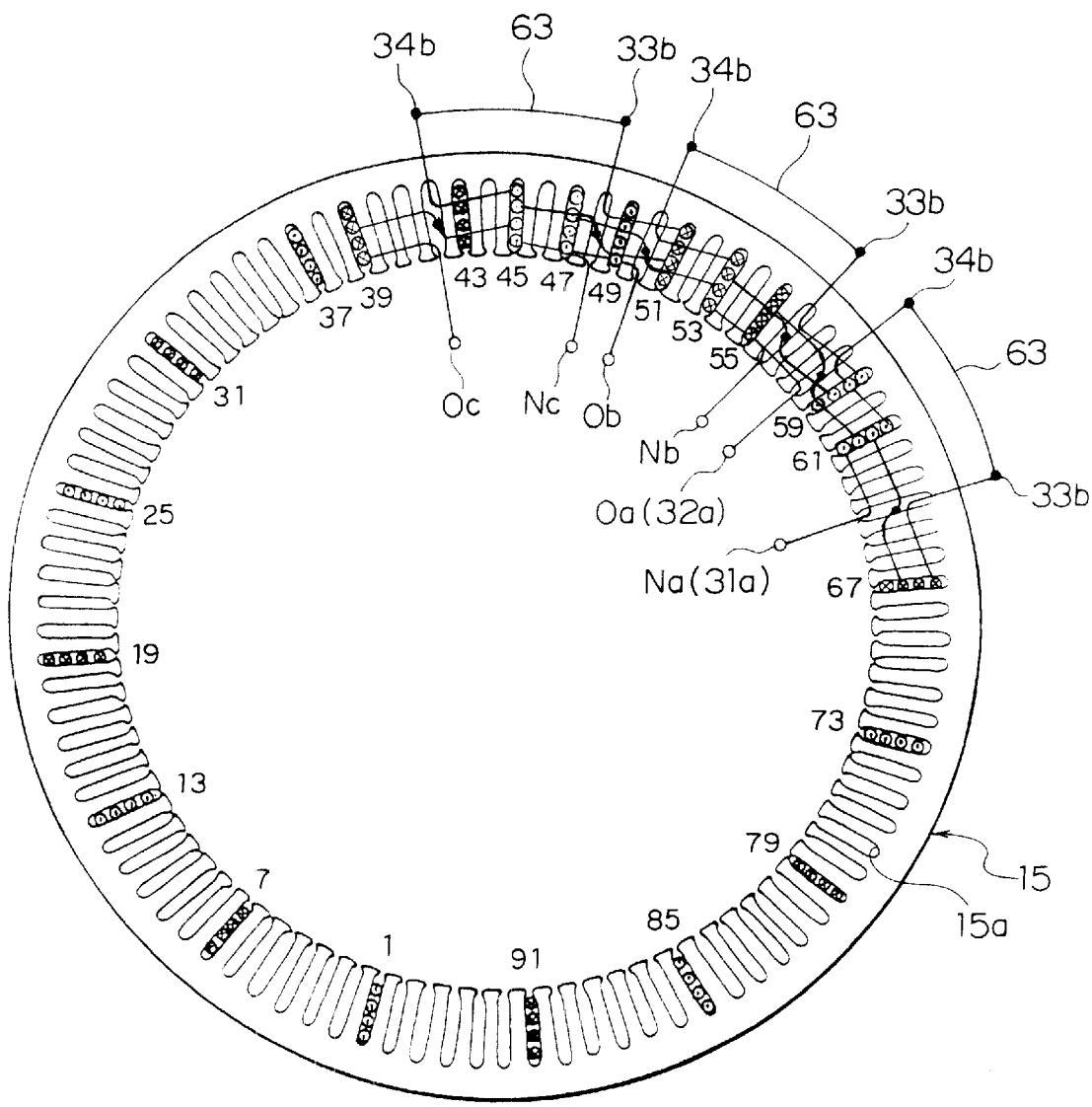
FIG. 6 is a rear-end view explaining connections in three phases of the stator winding used in the automotive alternator according to the embodiment of the present invention.
Figure 7:
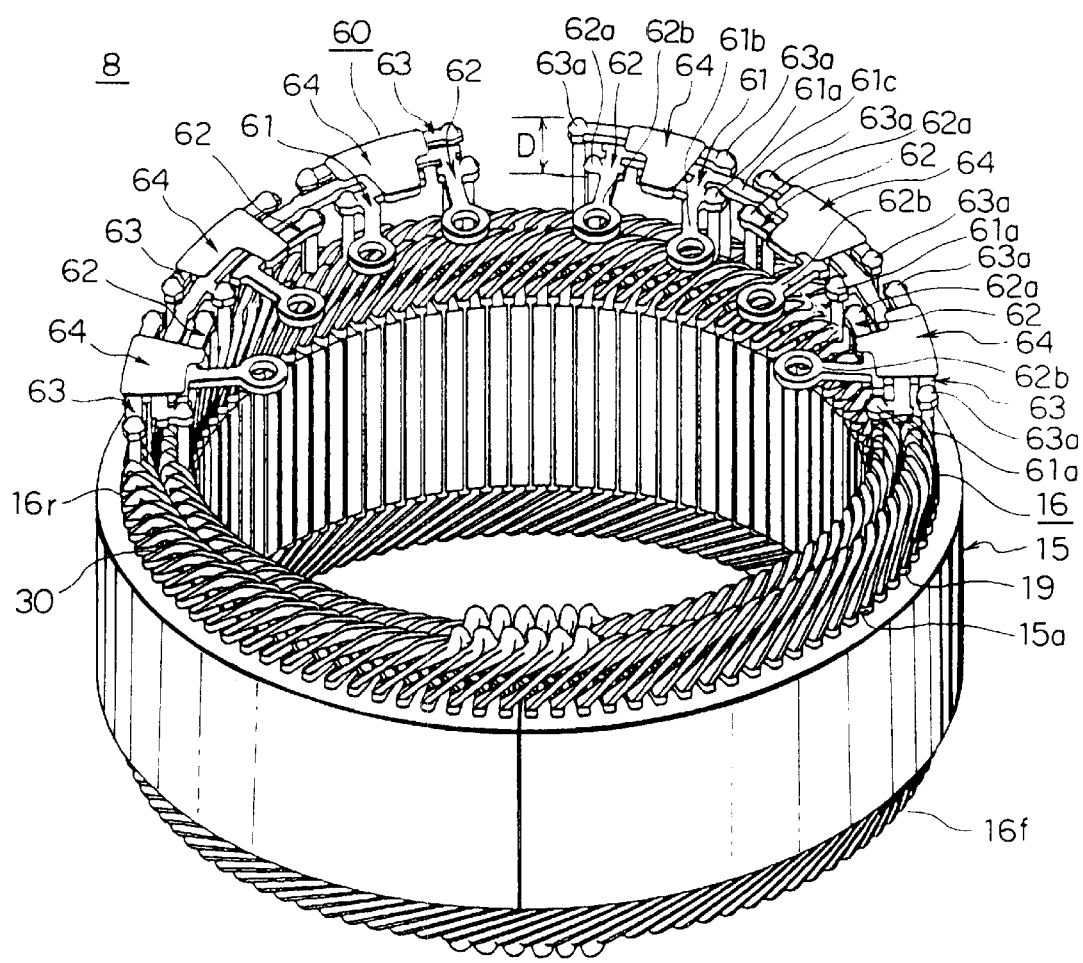
FIG. 7 is a perspective view of a stator used in the automotive alternator according to the embodiment of the present invention.
Figure 8:
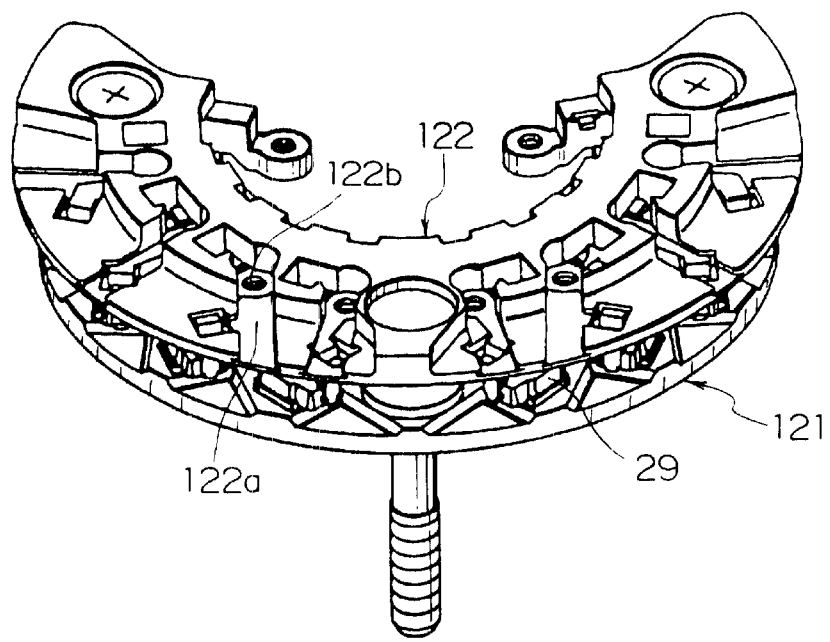
FIG. 8 is a perspective view of a rectifier used in the automotive alternator according to the embodiment of the present invention.
Figure 9:
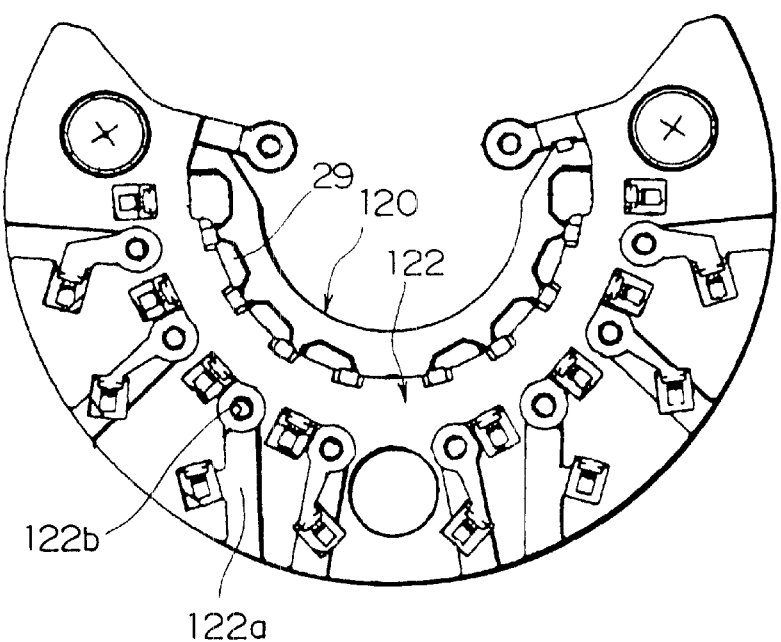
FIG. 9 is a plan view of the rectifier used in the automotive alternator according to the embodiment of the present invention.
Figure 10:
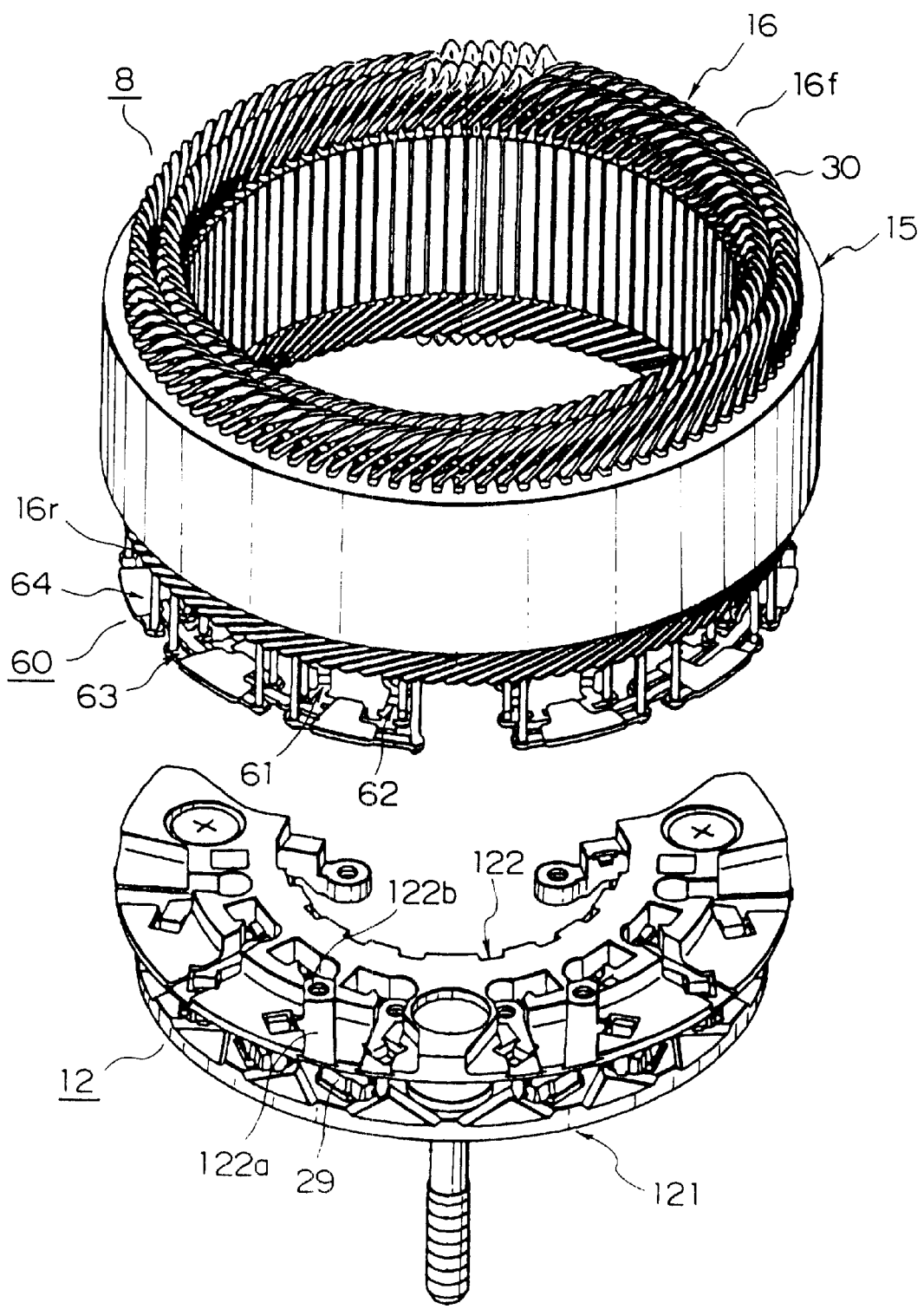
FIG. 10 is a perspective view showing the mounting of the stator to the rectifier, used in the automotive alternator according to the embodiment of the present invention.

FIG. 1 is a sectional view of an automotive alternator according to an embodiment of the present invention. FIG. 2 is a perspective view showing part of a strand of wire constituting a stator winding used in the automotive alternator. FIG. 3 is a diagram explaining arrangement of the strands of wire constituting the stator winding used in the automotive alternator. FIG. 4A is a rear-end view of a winding assembly constituting the stator winding used in the automotive alternator, and FIG. 4B is a plan view of the same. FIG. 5 is a rear-end view explaining connections in one phase of the stator winding used in the automotive alternator. FIG. 6 is a rear-end view explaining connections in three phases of the stator winding used in the automotive alternator. FIG. 7 is a perspective view of a stator used in the automotive alternator. FIGS. 8 and 9 are a perspective view and a plan view, respectively, of a rectifier used in the automotive alternator. FIG. 10 is a perspective view showing the mounting of the stator to the rectifier used in the automotive alternator according to the embodiment of the present invention.

In FIG. 1, a stator 8 has a size, including coil-end groups 16f and 16r of a stator winding 16, in the axial direction of a rotor 7 smaller than that of the rotor 7 in the same direction. The coil-end groups 16f and 16r are disposed so as not to overlap a fan unit 5 in a radial direction of the stator winding 16. The stator winding 16 is connected in an alternating connection by three-phase-connection terminal-assemblies 60. The three-phase-connection terminal-assemblies 60 are disposed at the rear side with respect to an end face of the fan unit 5 in the axial direction of the stator so as to oppose the top of the coil-end group 16r of the stator winding 16.

Figure 11:
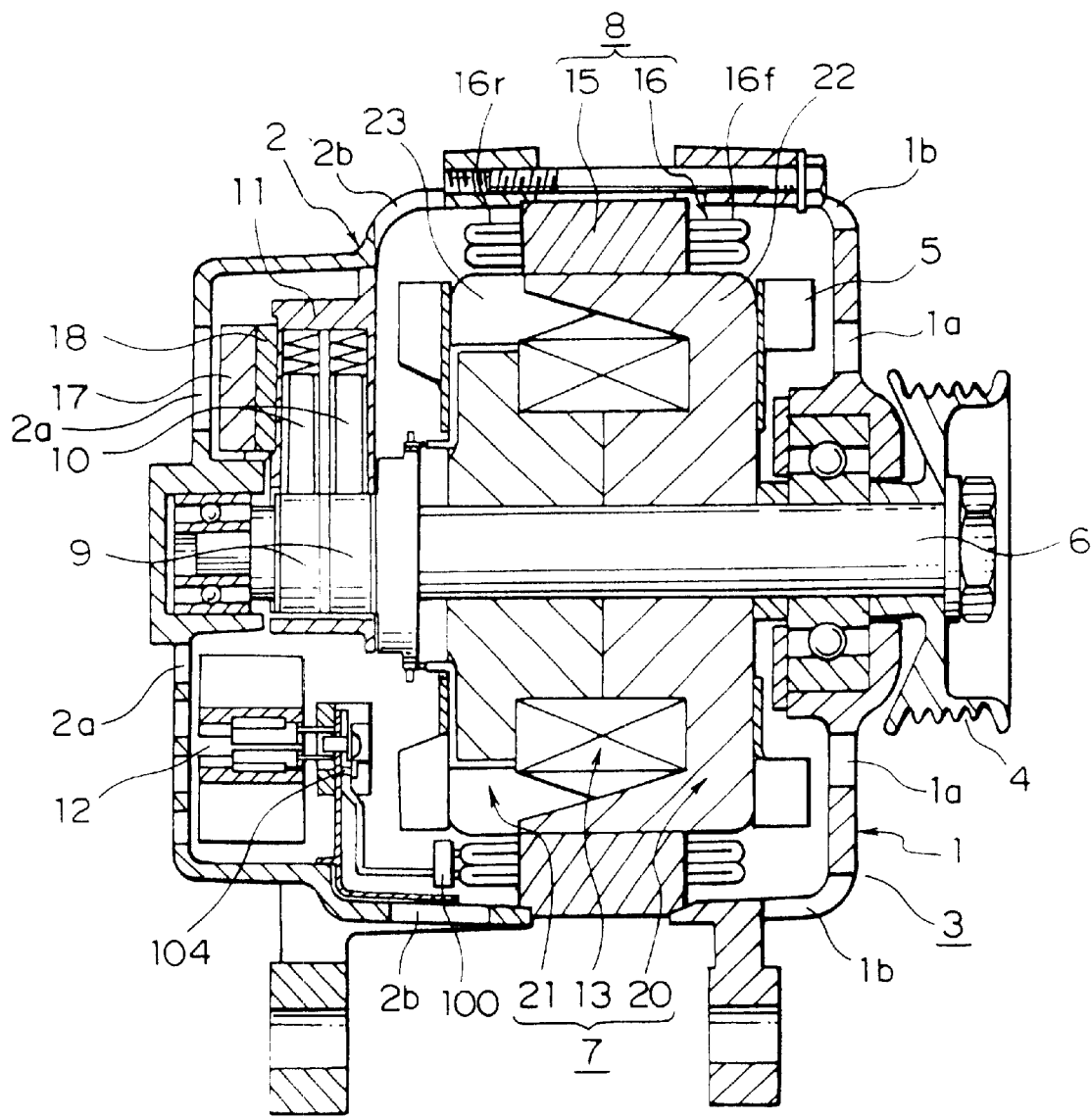
FIG. 11 is a sectional view of a known automotive alternator proposed in Japanese Patent Application No. 2000-011704.
Figure 12:
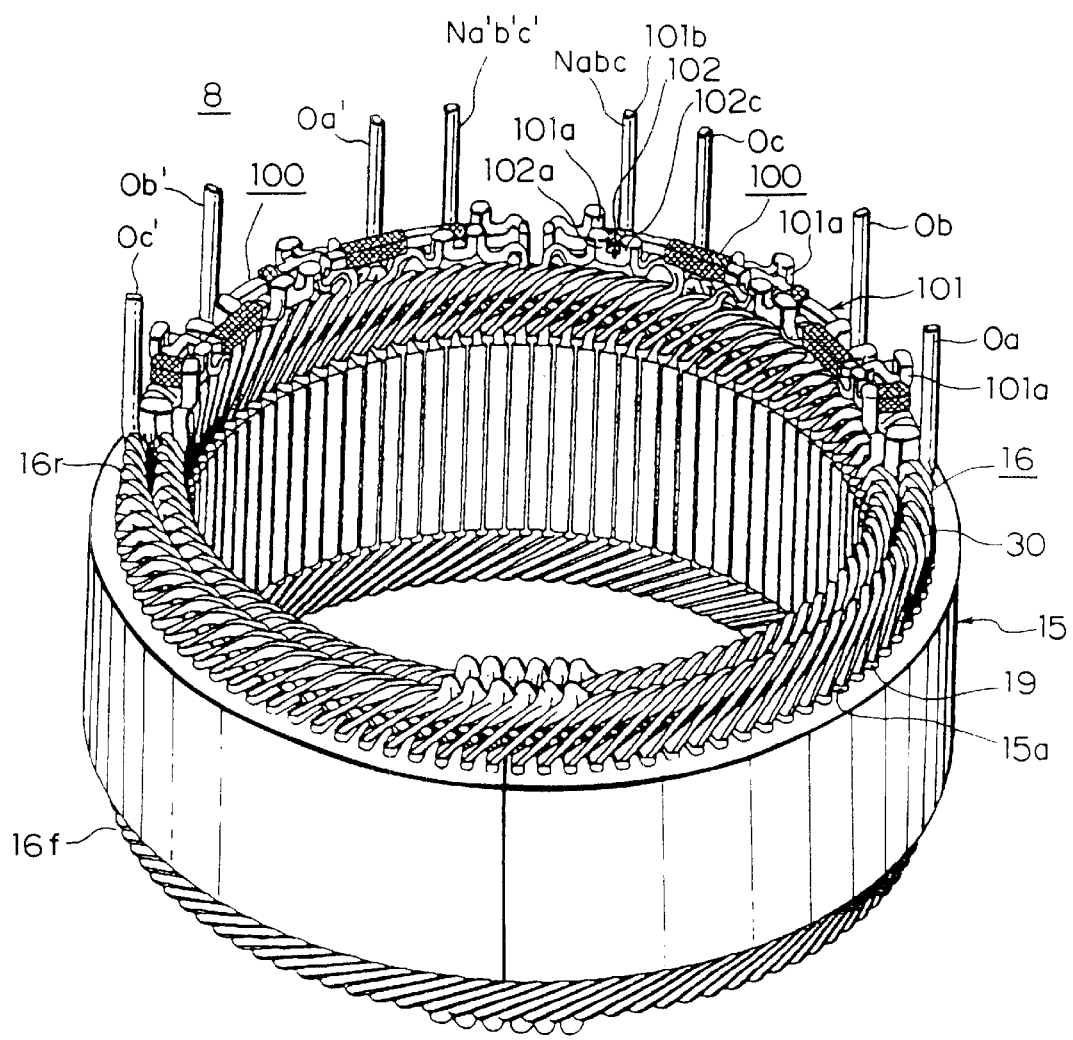
FIG. 12 is a perspective view of a stator used in the known automotive alternator.
Figure 13:
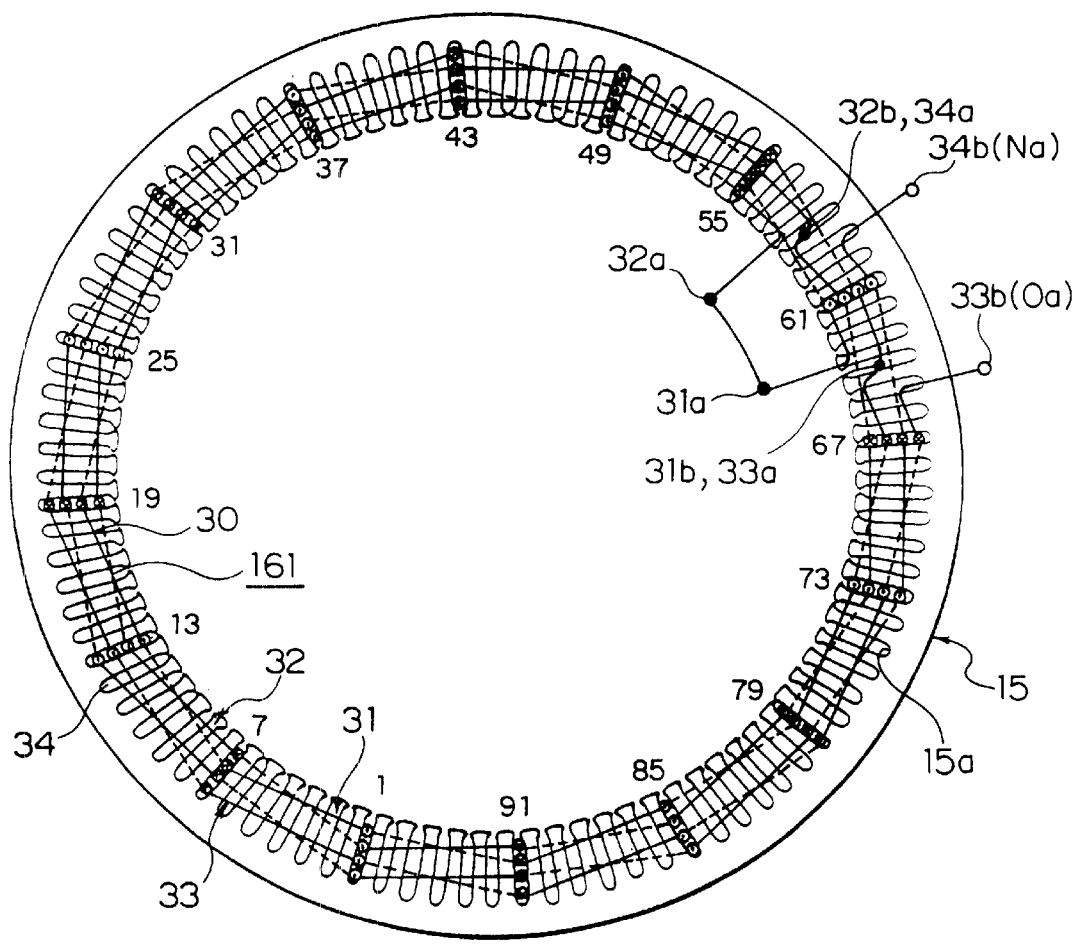
FIG. 13 is a rear-end view explaining connections in one phase of the stator winding used in the known automotive alternator.
Figure 14:
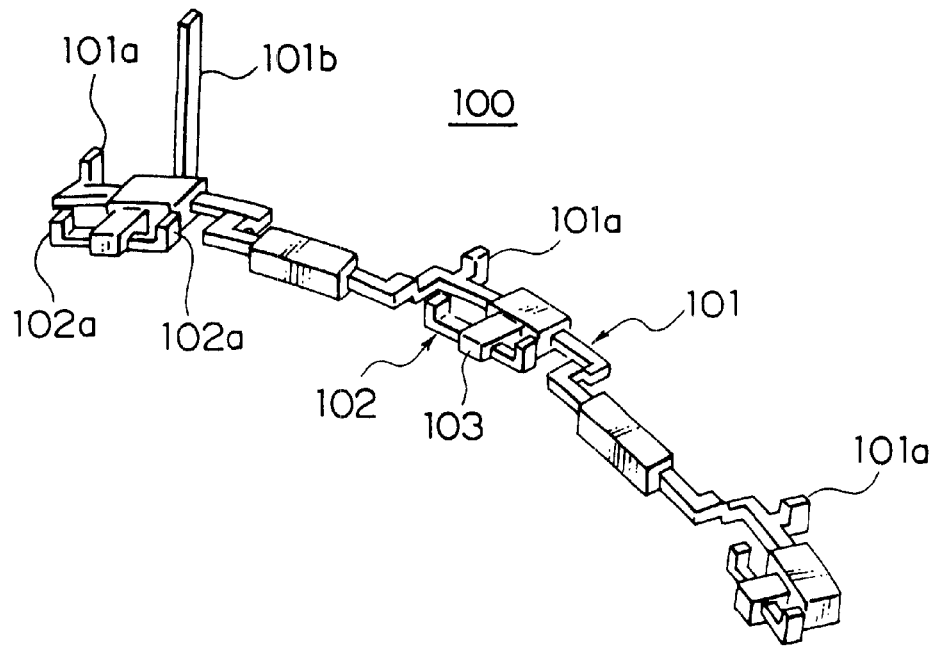
FIG. 14 is a perspective view of a three-phase-connection terminal-assembly used in the stator of the known automotive alternator.
Figure 15:
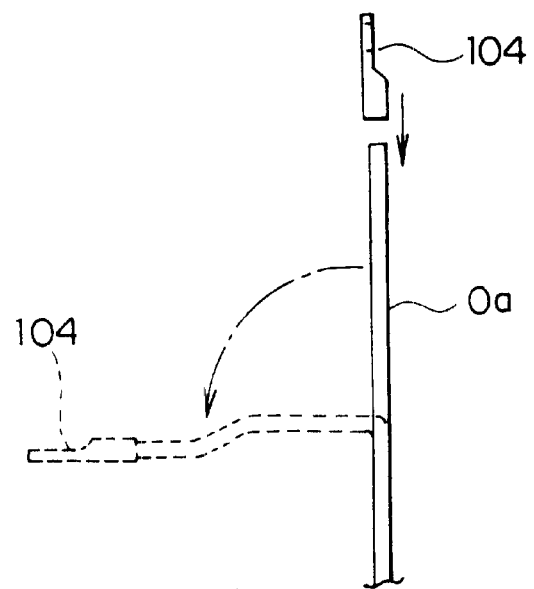
FIG. 15 is an illustration explaining a method of the connection between the stator winding and a rectifier used in the known automotive alternator.

The other configuration is the same as that of a known alternator shown in FIG. 11.

According to the embodiment 1, since the three-phase-connection terminal-assemblies 60 are disposed at the rear side with respect to an end face of the fan unit 5 in the axial direction of the stator so as to oppose the top of the coil-end group 16r of the stator winding 16, the three-phase-connection terminal-assemblies 60 are displaced from a space formed between the coil-end group 16r and a rectifier 12, which is an air flowing path from the fan unit 5.

Therefore, the wind resistance against the cooling air in the space between the coil-end group 16r and the rectifier 12 is reduced, and the volume of cooling air increases. As a result, the rectifier 12 and the stator winding 16 can be cooled efficiently, thereby suppressing the heat-up of the rectifier 12 and the stator winding 16, and the high output of the alternator can be realized. Moreover, wind noise can be reduced compared with the known automotive alternator in which the three-phase-connection terminal-assemblies 100 are disposed in that space when the volume of cooling air is the same.

Since the coil-end groups 16f and 16r of the stator 8 are disposed so as not to overlap the fan unit 5 in a radial direction of the stator winding 16, the wind resistance against the cooling air is more reduced, and the above-described efficiency can be more improved.

The components of the alternator are described below.

With reference to FIGS. 2, 3, 4A, and 4B the winding structure of the stator winding 16 is described.

A strand of wire 30 is made of a continuous copper wire having a rectangular section and coated with an insulative film 49. The strand of wire 30, as shown in FIG. 2, is formed by bending it into a planar pattern in which straight portions 30b as in-slot-received portions connected by turn portions 30a are lined up at a pitch of six slots (6p). Adjacent straight portions 30b are offset alternately by a distance equal to one width (w) of the strands of wire 30 by means of the turn portions 30a.

In FIG. 3, two strands of wire 30 formed in such a pattern that the straight portions 30b are overlapped each other by being offset by a pitch of six slots, thereby forming a wire-strand pair. Two strands of wire 30 constituting the wire-strand pair are first and second winding sub-portions 31 and 32 or third and fourth winding sub-portions 33 and 34 which are described below. The wire-strand pair are formed so that one strand of wire 30 is in a reverse position with respect to the other strand of wire 30 by being offset by an electrical angle of 180 degrees.

A winding assembly 39 shown in FIGS. 4A and 4B is constructed by arranging six wire-strand pair so as to be offset by a pitch of one slot from each other. Six ends of the strands of wire 30 extend at each side of each end of the winding assembly 39. The turn portions 30a are arranged so as to line up in rows on the sides of the winding assembly 39. In FIGS. 4A and 4B, lead wires, which are described below, are omitted.

Two winding assemblies 39 thus arranged are mounted so as to stack up within slots 15a of a stator core 15, thereby forming a stator before wire-connection. The strands of wire 30 are connected by welding to each other at the ends extending at the ends of the winding assemblies 39, whereby twenty-four wave-shaped windings each having one turn and mounted on the stator core 15 are obtained.

The winding structure of winding phase group 161 for one phase (phase a) is described with reference to FIG. 5. In FIG. 5, the wires 30 disposed at the rear side of the stator are shown by solid lines, and the wires 30 at the front side thereof are shown by dotted lines.

The winding phase group 161 for a phase a include first to fourth winding sub-portions 31 to 34, each winding sub-portion being formed with one strand of wire 30. The first winding sub-portion 31 is formed in a manner such that one strand of wire 30 is wound in a wave-shape into every sixth slot from slot number 1 to 91 so as to alternately occupy a first address and a second address inside the slots 15a, and the both ends of the strand of wire 30 are connected to each other, thereby forming the wave-shaped winding sub-portion in one turn. The second winding sub-portion 32 is formed in a manner such that one strand of wire 30 is wound in a wave-shape into every sixth slot from slot number 1 to 91 so as to alternately occupy the second address and the first address inside the slots 15a, and the both ends of the strand of wire 30 are connected to each other, thereby forming the wave-shaped winding sub-portion in one turn. The third winding sub-portion 33 is formed in a manner such that one strand of wire 30 is wound in a wave-shape into every sixth slot from slot number 1 to 91 so as to alternately occupy a third address and a fourth address inside the slots 15a, and the both ends of the strand of wire 30 are connected to each other, thereby forming the wave-shaped winding sub-portion in one turn. The fourth winding sub-portion 34 is formed in a manner such that one strand of wire 30 is wound in a wave-shape into every sixth slot from slot number 1 to 91 so as to alternately occupy the fourth address and the third address inside the slots 15a, and the both ends of the strand of wire 30 are connected to each other, thereby forming the wave-shaped winding sub-portion in one turn. The strands of wire 30 are arranged to line up in a row of four strands within each slot 15a with the longitudinal direction of their rectangular cross-sections aligned in a radial direction.

Portions of the strands of wire 30 of the second and fourth winding sub-portions 32 and 34 extending from slot numbers 55 and 61 at an end surface of the stator core 15 are cut, respectively, and portions of the strands of wire 30 of the first and third winding sub-portions 31 and 33 extending from slot numbers 61 and 67 at the end surface of the stator core 15 are cut, respectively. Then, a cut end 31b of the first winding sub-portions 31 and a cut end 33 a of the third winding sub-portion 33 are connected by arc welding or the like, a cut end 32b of the second winding sub-portions 32 and a cut end 34a of the fourth winding sub-portion 34 are connected by arc welding or the like, and a cut end 33b of the third winding sub-portions 33 and a cut end 34b of the fourth winding sub-portion 34 are connected by arc welding or the like. Thus, the winding phase group 161 in four turns for the phase a is formed with the first to fourth winding sub-portions 31 to 34 connected to each other in series.

Cut ends 31a and 32a of the first and second winding sub-portions 31 and 32, respectively, serve as a neutral-point lead wire Na and an alternating-current-output lead wire Oa for the phase a, respectively. The cut ends 33b and 34b of the third and fourth winding sub-portions 33 and 34, respectively, serve as bridge-connection lead wires for the phase a.

In the same manner, other five sets of four winding sub-portions are disposed in every sixth slot 15a. Thus, the winding phase groups 161 are formed for six phases, each set of four winding sub-portions being offset from the other by one slot. FIG. 6 shows connections in the winding sub-portions 161 for three phases (phases a, b, and c).

Each strand of wire 30 constituting the first to fourth winding sub-portions 31 to 34 is wound in a wave-shape in a manner such that the strand of wire 30 extends from one of the slots. 15a at an end face of the stator core 15, is folded back outside the slots 15a and is inserted in another slot 15a disposed away across five slots 15a therebetween. Each strand of wire 30 is wound so as to occupy alternately the inner layer and the outer layer with respect to the slot-depth direction (radial direction) in every sixth slot.

The strand of wire 30 extend outwards from each of the slots 15a at the end faces of the stator core 15 and is folded back to form turn portions 30a served as coil ends. The turn portions 30a which are formed into substantially the same shape at both ends of the stator 15 are mutually spaced circumferentially and radially, and arranged neatly in two rows circumferentially, to form coil-end groups 16f and 16r.

With reference to FIG. 7, the configuration of the three-phase-connection terminal-assembly 60 is described below.

The three-phase-connection terminal-assembly 60 includes a conductive neutral-point-connection member 61, three conductive alternating-current-output-connection members 62, three conductive bridge-connection members 63, and an insulative resin member 64 formed integrally with each other. The conductive neutral-point-connection member 61 made by pressing a metallic plate such as a copper plate includes three connection tabs 61a and a neutral-point-connection terminal 61b. Each conductive alternating-current-output-connection member 62 made by pressing a metallic plate such as a copper plate includes a connection tab 62a and an alternating-current-output-connection terminal 62b. Each conductive bridge-connection member 63 made by pressing a metallic plate such as a copper plate includes two connection tabs 63a.

The three conductive alternating-current-output-connection members 62 are disposed in line along the circumference of the stator 8 at the inner side of connecting parts 61c connecting the connection tabs 61a of the conductive neutral-point-connection member 61. The three conductive bridge-connection members 63 are disposed in line along the circumference of the stator 8 at the outer side of the connecting parts 61c. The conductive neutral-point-connection member 61, the conductive alternating-current-output-connection members 62, and the conductive bridge-connection members 63 are disposed on the same plane. The neutral-point-connection terminal 61b and the alternating-current-output-connection terminal 62b extend inwardly in the radial direction. A width D of the three-phase-connection terminal-assembly 60 including the conductive connection-members 61, 62, and 63 is smaller than that of the coil-end group 16r in a radial direction of the stator 8.

The configuration of the rectifier 12 is described below with reference to FIGS. 8 and 9.

The rectifier 12 includes a pair of semicircular heat sinks 120 and 121 coaxially disposed with the major surfaces thereof facing in the same direction as each other. A semicircular circuit board 122 is laminated on the heat sinks 120 and 121 at the major surface thereof. Eight diodes 29 are fixed to the major surface of each of the heat sinks 120 and 121. The circuit board 122 is provided with eight connection-terminals 122a, each connecting one of the diodes 29 disposed on the major surface of the heat sink 120 with one of the diodes 29 disposed on the major surface of the heat sink 121. The connection terminal 122a is provided with a threaded hole 122b.

A method of manufacturing of the stator 8 is described as follows.

Two winding assemblies 39 are stacked one on top of the other and are mounted on a parallelepiped stator core (not shown) at the slots 15a formed thereon. The parallelepiped stator core mounted with the winding assemblies 39 is rolled up in a cylindrical shape and its ends abutted and welded each other. Thus, the cylindrical stator core 15 is formed.

The strands of wire 30 constituting the winding assemblies 39 are connected at the ends thereof, thereby forming the stator 8 including the stator core 15 mounted with twenty-four wires of the first to fourth winding sub-portions 31 to 34, each being wound in one turn. In the same set of the first to fourth winding sub-portions 31 to 34 mounted in the same slots disposed at a pitch of six slots, as shown in FIG. 5, the first and third winding sub-portions 31 and 33 are connected at cut ends 31b and 33a, respectively, and the second and fourth winding sub-portions 32 and 34 are connected at cut ends 32b and 34a, respectively. The cut ends 31a, 32a, 33b, and 34b of the first to fourth winding sub-portions 31 to 34, respectively, extend to the same level as each other in the axial direction and in parallel to each other.

Each three-phase-connection terminal-assembly 60 is disposed opposing the top of the coil-end group 16r so that the cut ends 31a, 32a, 33b, and 34b of the first to fourth winding sub-portions 31 to 34 for each phase are disposed so as to abut on one of the connection tabs 61a of the conductive neutral-point-connection member 61, on the connection tab 62a of one of the conductive alternating-current-output-connection members 62, and on the two connection tabs 63a of one of the conductive bridge-connection members 63, respectively. The cut ends 33b and 34b of the third and fourth winding sub-portions 33 and 34 for each phase, respectively, are connected to the two connection tabs 63a of the conductive bridge-connection member 63, whereby the winding phase group 161 in four turns for each phase is formed with the first to fourth winding sub-portions 31 to 34. By connecting the cut end 31a of the first winding sub-portion 31 for each phase to the individual connection tabs 61a of the conductive neutral-point-connection member 61, each three-phase alternating winding 160 is formed with the three winding phase groups 161 connected into a star connection. By connecting the cut end 32a of the second winding sub-portion 32 for each phase to the connection tab 62a of each conductive alternating-current-output-connection member 62, output terminals of the three-phase alternating winding 160 are connected to the alternating-current-output-connection terminals 62b of the three conductive alternating-current-output-connection members 62. Thus, the stator 8 including the stator winding 16 connected into an alternating connection by the three-phase-connection terminal-assemblies 60 is formed as shown in FIG. 7.

Figure 16:
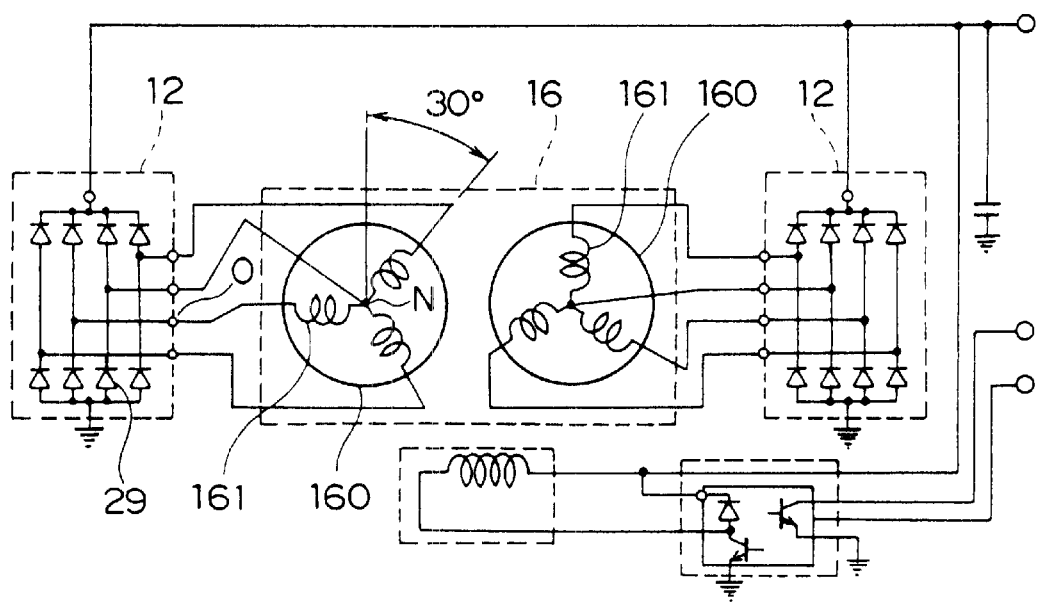
FIG. 16 is a block diagram of a circuit used in the known automotive alternator.

The stator 8 thus formed is mounted in the case 3 in a manner such that the stator 8 and the rectifier 12 are positioned so that the three-phase-connection terminal-assemblies 60 oppose the circuit boards 122, as shown in FIG. 10. The neutral-point-connection terminal 61b and the alternating-current-output-connection terminals 62b of each three-phase-connection terminal-assembly 60 are connected to the rectifier 12 by being fixed by screws 38 to the threaded holes 122b of the connection terminals 122a of the circuit board 122 included in the rectifier 12. Thus, circuits shown in FIG. 16 are formed with two sets of the three-phase alternating winding 160, each set including the star-connected winding phase groups 161 for three phases connected to the rectifier 12. The direct-current outputs of the rectifiers 12 are combined by being connected to each other in parallel.

According to the present embodiment, the cut ends 32a of the second winding sub-portions 32, which are alternating-output lead wires of the three-phase alternating windings 160, are connected to the connection tabs 62a of the conductive alternating-output-relay members 62 having the alternating-current-output-connection terminals 62b, whereby each three-phase alternating winding 160 can be connected to the rectifier 12 by connecting the alternating-current-output-connection terminals 62b to the connection terminals 122a of the circuit boards 122 of the rectifier 12. Therefore, operations of fixing metallic connection-terminals to the alternating-output lead wires and bending the lead wires inwardly in the radial direction, which are necessary in the known alternator, are not required, thereby improving the efficiency in a connection process.

The cut ends 31a of the three first winding sub-portions 31, which are the neutral-point lead wires, of the winding phase groups 161 for three phases, respectively, are connected to the three connection tabs 61a, respectively, of the conductive neutral-point-connection member 61. Therefore, operations of leading three neutral-point lead wires to one position, twisting the three lead wires, and soldering them, which are necessary in the known alternator, are not required, thereby improving the efficiency in a connection process. Since the neutral-point-connection terminal 61b is provided formed integrally with the conductive neutral-point-connection member 61, operations of fixing metallic connection-terminals to the neutral-point lead wires and bending the lead wires inwardly in the radial direction, which are necessary in the known alternator, are not required, thereby improving the efficiency in a connection process.

The third and fourth winding sub-portions 33 and 34 are bridge-connected to each other by connecting the cut ends 33b and 34b of the third and fourth winding sub-portions 33 and 34, respectively, which are bridge-connection lead wires between the third and fourth winding sub-portions 33 and 34 to the connection tabs 63a of the conductive bridge-connection member 63. Therefore, operations of leading three bridge-connection lead wires of each winding sub-portion to one position, twisting the three lead wires, and soldering them, which are necessary in the known alternator, are not required, thereby improving the efficiency in a connection process.

The neutral-point lead wires, the alternating-output lead wires, and the bridge-connection lead wires extend from the coil-end group 16r in the axial direction in parallel to each other, and are connected to the conductive relay members 61, 62, and 63, respectively, at substantially the same predetermined level from an end face of the stator core 15, thereby improving the efficiency in a connection process.

The conductive relay members 61, 62, and 63 are formed integrally to each other by the insulative resin 64, whereby the conductive relay members 61, 62, and 63 are easy to handle in assembling.

The width D of the conductive relay members 61, 62, and 63 in a radial direction of the stator is smaller than that of the coil-end group 16r of the stator winding 16, whereby the space between the rotor 7 and the conductive relay members 61, 62, and 63 is kept large, thereby providing flexible design options for the components such as the fan unit 5.

Since each of the first to fourth winding sub-portions 31 to 34 is formed in a wave-shaped winding in one turn with a continuous conductive wire, the number of connecting points can be greatly reduced compared with a known alternator in which short copper wires formed substantially in a U-shape are used. Therefore, the productivity and yield ratio are improved, the height to which the coil ends extend outwards from the stator core 15 is reduced, and the exposure area of the coil ends is increased, whereby a high-output alternator reduced in size can be obtained.

The winding sub-portions are formed with the individual winding assemblies 39 which include wave-shaped wires in one turn, whereby the insulative films 49 are prevented from being damaged during the mounting on the stator core 15. The insulation can be secured, and the number of turns can be easily increased as needed.

Although according to the present embodiment, a copper wire having a rectangular section is used in a strand of wire, the shape of the strand of wire is not limited to that, and a copper wire having a circular section may, for example, be used. With this arrangement, the strand of wire can be formed more easily, and the connection of the strands of wire to the conductive relay members is more easily performed, thereby improving the productivity. The strand of wire is not limited to a copper wire, and it may, for example, be an aluminum wire.

Although according to the present embodiment, a continuous wire is used as the strand of wire, a conductor segment of a short copper wire formed substantially in a U-shape may be used, by which the same effect can be obtained.

Although in the present embodiment, the stator winding are used in an automotive alternator, the stator winding may be used in an alternator for other use.

Although according to the embodiment 1, the fan unit 5 is provided inside the case 3 formed the front and rear brackets 1 and 2, the fan unit may be provided outside the case, by which the same effect can be obtained.

Although according to the present embodiment, the conductive relay members are disposed at the rear side with respect to the stator, the conductive relay members may be disposed at the front side with respect to the stator without covering the portions of the front-end coil-end group of the stator winding opposing a fan fixed to a front end surface of the rotor, and only the alternating-output lead wires may be led out from the rear-end coil-end group toward the rear side. With this arrangement, the wind resistance to the cooling air between the stator winding and the rectifier can be suppressed and efficiency in the cooling of the stator winding 16 at the front side can be maintained, thereby providing the same effect.

Although according to the present embodiment, four strands of wire are arranged so as to line up in a row radially within each slot and the turn portions are arranged to line up in two rows circumferentially to form coil-end groups, six strands of wire may be arranged so as to line up in a row radially within each slot and the turn portions may be arranged to line up in three rows circumferentially to form coil-end groups. Or eight strands of wire are arranged so as to line up in a row radially within each slot and the turn portions are arranged to line up in four rows circumferentially to form coil-end groups. As the number of the strands of wire lined up within each slot increases, the number of connection points increases. Therefore, when the conductive relay members according to the present invention are not used, the wind resistance against the cooling air increases, and the efficiency in manufacturing operation decreases. The wind resistance against the cooling air and the deterioration in the efficiency in the manufacture can be suppressed by using the conductive relay members according to the present invention.

As described above, the alternator according to the present invention offers the following advantages.

The alternator according to the present invention comprises: a stator including a cylindrical stator core provided with a plurality of slots extending in an axial direction of the stator, the plurality of slots being disposed in parallel to each other along the circumference of the stator, and a stator winding mounted in the plurality of slots of the cylindrical stator core, the stator winding including n-sets (n represents a natural number) of a three-phase alternating winding, each set of the three-phase alternating winding being constructed by connecting winding phase groups for three phases offset from each other by an electrical angle of 120 degrees into an alternating connection; a rotor enclosed by the cylindrical stator core; a fan unit mounted on the rotor; and a rectifier, wherein the stator winding comprises first wave-shaped windings and second wave-shaped windings, the first wave-shaped windings being composed of 3n first winding sub-portions each having one turn constructed by winding in a wave-shape a strand of wire so as to alternately occupy an inner layer and an outer layer in a slot-depth direction within the slots at every 3·nth slot, the first winding sub-portions being disposed at a pitch of one slot from each other, and the second wave-shaped windings being composed of 3n second winding sub-portions each having one turn constructed by winding in a wave-shape the strand of wire so as to alternately occupy the inner layer and the outer layer in the slot-depth direction within the slots at every 3·nth slot and so as to be inversely wound and offset by an electrical angle of 180 degrees relative to the first winding sub-portions, the second winding sub-portions being disposed at a pitch of one slot from each other, whereby m-pairs (m represents a natural number) of the first wave-shaped windings and the second wave-shaped windings are disposed so as to arrange alternately and in a row in-slot-received portions of the first winding sub-portions and in-slot-received portions of the second winding sub-portions in the slot-depth direction within each of said slots; wherein each set of the three-phase alternating winding is formed by connecting a plurality of lead wires to each other extending from the first winding sub-portions and the second winding sub-portions via a conductive relay member, and connecting into the alternating connection the three winding phase groups each composed of the first winding sub-portions and the second winding sub-portions which are mounted in every 3·nth slot; and wherein the conductive relay member opposes the top of a coil-end group of the stator winding across a gap therebetween. With this arrangement, the wind resistance against cooling air at the top of the stator winding is reduced, thereby improving the cooling efficiency of the stator winding and improving the efficiency in an alternating connection process, and a high output alternator reduced in size can be obtained.

The fan unit may be fixed to the rotor at at least one end thereof, the rectifier may be disposed at a side of the rotor to which the fan unit is fixed, the conductive relay member may be disposed at the side of the rotor to which the fan unit is fixed and be disposed opposite to the rotor with respect to an end face of the fan unit in the axial direction of the rotor, the plurality of lead wires may serve as alternating-output lead wires for the three-phase alternating winding, the conductive relay member may serve as conductive alternating-output-relay members having alternating-current-output-connection terminals extending inwardly in the radial direction of the rotor, and the alternating-output lead wires may be connected to the conductive alternating-output-relay members and be connected to the rectifier via the alternating-current-output-connection terminals. With this arrangement, the wind resistance against cooling air between the stator winding and the rectifier is reduced, the cooling efficiency of the rectifier and the stator winding, and the efficiency in an alternating connection process can be improved. Lead-wire-processing operations of fixing metallic connection-terminals to the alternating-output lead wires and bending the lead wires inwardly in the radial direction for connecting the lead wires to the rectifier are not necessary, thereby improving the efficiency in a connection process.

The plurality of lead wires may serve as neutral-point-connection lead wires for the winding phase group, the conductive relay member may serve as a conductive neutral-point-relay member, and the neutral-point-connection lead wire for each phase may be integrally connected to the conductive neutral-point-relay member. Therefore, lead-wire-processing operations of drawing the neutral-point lead wires, gathering the same in a position, twisting the lead wires, and soldering the same are not necessary, thereby improving the efficiency in a connection process.

The conductive neutral-point-relay member may include a neutral-point-connection terminal extending inwardly in the radial direction of the stator, and the neutral-point-connection terminal may be connected to the rectifier. Therefore, lead-wire-processing operations of fixing metallic connection-terminals to the neutral-point lead wires and bending the lead wires inwardly in the radial direction of the stator for connecting the lead wires to the rectifier are not necessary, thereby further improving the efficiency in a connection process.

The plurality of lead wires may serve as bridge-connection lead wires between the first winding sub-portions and the second winding sub-portions, the conductive relay member may serve as conductive bridge-connection-relay members, and the bridge-connection lead wires may be connected to the conductive bridge-connection-relay members, whereby the first winding sub-portions and the second winding sub-portions are bridge-connected. With this arrangement, lead-wire-processing operations of drawing a plurality of bridge-connection lead wires, gathering the same in a position, twisting the lead wires, and soldering the same are not necessary, thereby improving the efficiency in a connection process.

The plurality of lead wires may extend in parallel to each other from the first winding sub-portions and the second winding sub-portions in the axial direction, and may be connected to the conductive relay member substantially at the same predetermined level as each other from an end face of the stator core, thereby improving the efficiency in a connection process.

The conductive relay member and an insulative resin member may be formed integrally with each. other. Therefore, it is easy to handle the conductive relay member, thereby improving the efficiency in an assembly process.

The stator may be formed so that the coil-end group of the stator winding does not overlap the fan unit in the radial direction. Therefore, the resistance to airflow is reduced, thereby improving the cooling efficiency in the rectifier and the stator winding.

The size of the conductive relay member in a radial direction of the stator may be not greater than the size of the coil-end group of the stator winding in the radial direction of the stator, whereby the space between the rotor and the conductive relay member is increased, thereby providing flexible design options for the components such as the fan.

The strand of wire may be a continuous conductive wire, and the first winding sub-portion and the second winding sub-portion may form each of the first wave-shaped windings wound in one turn and each of the second wave-shaped windings wound in one turn, respectively, enabling the number of connecting points to be greatly reduced. Therefore, the productivity and yield ratio are improved, the protrusion of the coil-end groups decreases, and the exposure area of the coil-end groups increases, whereby a high-output alternator reduced in size can be obtained.

The each pair of the first wave-shaped windings and the second wave-shaped windings may be formed with a winding assembly composed of a plurality of the first winding sub-portions and a plurality of the second winding sub-portions. With this arrangement, the insulative film are prevented from being damaged during the mounting on the stator core. The insulation can be secured, and the number of turns can be easily increased as needed.

What is claimed is:

1. An alternator comprising:
    a stator including a cylindrical stator core provided with a plurality of slots extending in an axial direction of said stator, said plurality of slots being disposed in parallel to each other along the circumference of said stator, and a stator winding mounted in said plurality of slots of said cylindrical stator core, said stator winding including n-sets, where n represents a natural number, of three-phase windings, each set of said three-phase windings being constructed by connecting winding phase groups for three phases offset from each other by an electrical angle of 120 degrees into an alternating connection;
    a rotor enclosed by said cylindrical stator core;
    a fan unit mounted on said rotor; and
    a rectifier,
    wherein said stator winding comprises first wave-shaped windings and second wave-shaped windings, said first wave-shaped windings being composed of 3n first winding sub-portions each having one turn constructed by winding in a wave-shape a strand of wire so as to alternately occupy an inner layer and an outer layer in a slot-depth direction within said slots at every 3·nth slot, said first winding sub-portions being disposed at a pitch of one slot from each other, and said second wave-shaped windings being composed of 3n second winding sub-portions each having one turn constructed by winding in a wave-shape a strand of wire so as to alternately occupy the inner layer and the outer layer in the slot-depth direction within said slots at every 3·nth slot and so as to be inversely wound and offset by an electrical angle of 180 degrees relative to said first winding sub-portions, said second winding sub-portions being disposed at a pitch of one slot from each other, whereby m-pairs, where m represents a natural number, of said first wave-shaped windings and said second wave-shaped windings are disposed so as to be arranged alternately and in a row in-slot-received portions of said first winding sub-portions and in-slot-received portions of said second winding sub-portions in the slot-depth direction within each of said slots;
    wherein each set of said three-phase windings is formed by connecting a plurality of lead wires to each other extending from said first winding sub-portions and said second winding sub-portions via a conductive relay member, and connecting into the alternating connection said three winding phase groups each composed of said first winding sub-portions and said second winding sub-portions which are mounted in every 3·nth slot; and
    wherein said conductive relay member opposes the top of a coil-end group of said stator winding across a gap therebetween.

2. The alternator according to claim 1, wherein said fan unit is fixed to said rotor at at least one end thereof, said rectifier is disposed at a side of said rotor to which said fan unit is fixed, said conductive relay member is disposed at the side of said rotor to which said fan unit is fixed and is disposed opposite to said rotor with respect to an end face of said fan unit in the axial direction of said rotor, said plurality of lead wires serve as alternating-output lead wires for said three-phase alternating winding, said conductive relay member serves as conductive alternating-output-relay members having alternating-current-output-connection terminals extending inwardly in the radial direction of said rotor, and said alternating-output lead wires are connected to said conductive alternating-output-relay members and are connected to said rectifier via said alternating-current-output-connection terminals.

3. The alternator according to claim 1, wherein said plurality of lead wires serve as neutral-point-connection lead wires for said winding phase group, said conductive relay member serves as a conductive neutral-point-relay member, and said neutral-point-connection lead wire for each phase is integrally connected to said conductive neutral-point-relay member.

4. The alternator according to claim 3, wherein said conductive neutral-point-relay member includes a neutral-point-connection terminal extending inwardly in the radial direction of said stator, and said neutral-point-connection terminal is connected to said rectifier.

5. The alternator according to claim 1, wherein said plurality of lead wires serve as bridge-connection lead wires between said first winding sub-portions and said second winding sub-portions, said conductive relay member serves as conductive bridge-connection-relay members, and said bridge-connection lead wires are connected to said conductive bridge-connection-relay members, whereby said first winding sub-portions and said second winding sub-portions are bridge-connected.

6. The alternator according to claim 1, wherein said plurality of lead wires extend in parallel to each other from said first winding sub-portions and said second winding sub-portions in the axial direction, and are connected to said conductive relay member substantially at the same predetermined level as each other from an end face of said stator core.

7. The alternator according to claim 1, wherein said conductive relay member and an insulative resin member are formed integrally with each other.

8. The alternator according to claim 1, wherein said stator is formed so that the coil-end group of said stator winding does not overlap said fan unit in the radial direction.

9. The alternator according to claim 1, wherein the size of said conductive relay member in a radial direction of said stator is not greater than the size of the coil-end group of said stator winding in the radial direction of said stator.

10. The alternator according to claim 1, wherein said strand of wire is a continuous conductive wire, and said first winding sub-portion and said second winding sub-portion form each of said first wave-shaped windings wound in one turn and each of said second wave-shaped windings wound in one turn, respectively.

11. The alternator according to claim 10, wherein each pair of said first wave-shaped windings and said second wave-shaped windings is formed with a winding assembly composed of a plurality of said first winding sub-portions and a plurality of said second winding sub-portions.

* * * * *